(12) United States Patent
Kim et al.

(10) Patent No.: US 7,539,100 B2
(45) Date of Patent: May 26, 2009

(54) OPTICAL RECORDING MEDIUM, METHOD OF MANAGING DEFECTIVE AREA THEREOF, RECORDING METHOD THEREOF, AND RECORDING/REPRODUCING APPARATUS THEREOF

(75) Inventors: Jin Yong Kim, Gyeonggi-do (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 10/891,029

(22) Filed: Jul. 15, 2004

(65) Prior Publication Data

US 2005/0210319 A1 Sep. 22, 2005

(30) Foreign Application Priority Data

Jul. 15, 2003 (KR) ...................... 10-2003-0048330

(51) Int. Cl.
*G11B 7/00* (2006.01)
(52) U.S. Cl. ................ 369/53.17; 369/53.12; 369/53.15
(58) Field of Classification Search ........................ None
See application file for complete search history.

(56) References Cited

U.S. PATENT DOCUMENTS

| | | | |
|---|---|---|---|
| 4,733,386 A | 3/1988 | Shimoi et al. |
| 4,807,205 A | 2/1989 | Picard et al. |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

*Primary Examiner*—Wayne R Young
*Assistant Examiner*—Lixi Chow
(74) *Attorney, Agent, or Firm*—Birch, Stewart, Kolasch & Birch, LLP

(57) ABSTRACT

The present invention provides a method of managing a defective area of an optical disc recordable at high speed, recording/reproducing method thereof, and recording/reproducing apparatus thereof, by which an accurate decision of the defective area is provided. Moreover, as optimal recording speed is applicable to re-recording in a specific section, thereby enabling to secure high reliance of data. In an optical disc provided with a defect management area for defect management within a high-speed recordable disc, the present invention includes verifying whether the defective area is generated in performing a recording at high speed, re-verifying presence or non-presence of defect of a corresponding area by changing a recording speed into low speed if the defective area is generated at the high speed, and recording to manage in the defect management area a location information of an area decided as the defective area at the high speed but as a non-defective area at the low speed.

18 Claims, 11 Drawing Sheets

U.S. PATENT DOCUMENTS

| | | | |
|---|---|---|---|
| 5,442,611 A | 8/1995 | Hosaka et al. | |
| 5,448,728 A | 9/1995 | Takano et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,848,038 A | 12/1998 | Igarashi et al. | |
| 5,867,455 A | 2/1999 | Miyamoto et al. | |
| 5,914,928 A | 6/1999 | Takahashi et al. | |
| 5,940,702 A | 8/1999 | Sakao et al. | |
| 6,058,085 A | 5/2000 | Obata et al. | |
| 6,118,608 A * | 9/2000 | Kakihara et al. | 360/53 |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,564,345 B1 | 5/2003 | Kim et al. | |
| 6,581,167 B1 | 6/2003 | Gotoh et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,785,206 B1 | 8/2004 | Lee et al. | |
| 6,788,631 B1 | 9/2004 | Park et al. | |
| 6,795,389 B1 | 9/2004 | Nishiuchi et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,883,111 B2 | 4/2005 | Yoshida et al. | |
| 6,918,003 B2 | 7/2005 | Sasaki et al. | |
| 6,934,236 B2 | 8/2005 | Lee et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 * | 8/2006 | Choi et al. | 369/53.16 |
| 7,123,556 B2 | 10/2006 | Ueda et al. | |
| 7,149,930 B2 | 12/2006 | Ogawa et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,349,301 B2 | 3/2008 | Terada et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 * | 11/2001 | Ito et al. | 369/47.44 |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 * | 5/2003 | Hung et al. | 369/47.44 |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 * | 10/2003 | Go et al. | 369/47.44 |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0193946 A1 | 9/2004 | Park et al. | |
| 2004/0223427 A1 | 11/2004 | Kim et al. | |
| 2004/0246851 A1 | 12/2004 | Hwang et al. | |
| 2005/0007910 A1 | 1/2005 | Ito et al. | |
| 2005/0025007 A1 | 2/2005 | Park | |
| 2005/0047294 A1 | 3/2005 | Park | |
| 2005/0050402 A1 | 3/2005 | Koda et al. | |
| 2005/0052972 A1 | 3/2005 | Park | |
| 2005/0052973 A1 | 3/2005 | Park | |
| 2005/0055500 A1 | 3/2005 | Park | |
| 2005/0060489 A1 | 3/2005 | Park | |
| 2005/0068877 A1 | 3/2005 | Yeo | |
| 2005/0083740 A1 | 4/2005 | Kobayashi | |
| 2005/0083767 A1 | 4/2005 | Terada et al. | |
| 2005/0083830 A1 | 4/2005 | Martens et al. | |
| 2005/0195716 A1 | 9/2005 | Ko et al. | |
| 2005/0289389 A1 | 12/2005 | Yamagami et al. | |

| | | | |
|---|---|---|---|
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1 132 914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065 A0 | 5/2005 |
| EP | 1564740 A1 | 8/2005 |
| EP | 1573723 A0 | 9/2005 |
| EP | 1612790 A1 | 1/2006 |
| EP | 1623422 A0 | 2/2006 |
| GB | 2356735 A | 5/2001 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 102004009430 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/015180 A1 | 9/2004 |
| WO | WO-2004/075180 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

* cited by examiner

FIG. 5

| Status1 | Status2 | meaning |
|---------|---------|---------|
| 0000 | 0000 | "RAD" entry Including Replacement address |
| 1001 | 0000 | "NDR" entry for each cluster Including Recording speed info |

FIG. 7

| Status1 | Status2 | meaning |
|---|---|---|
| 0000 | 0000 | "RAD" entry Including Replacement address |
| 1001 | Size info (XXXX) | "NDR" entry for consecutive cluster Including Start address, Size info, Recording speed info |

| Status1 | Status2 | meaning |
|---|---|---|
| 0000 | 0000 | "RAD" entry Including Replacement address |
| 1001 | 0000 | "NDR" entry for each cluster Including Recording speed info |
| 1001 | 0001 | "NDR" pair entry (1) Including start-end address |
| 1001 | 0010 | "NDR" pair entry (2) Including Recording speed info |

US 7,539,100 B2

OPTICAL RECORDING MEDIUM, METHOD OF MANAGING DEFECTIVE AREA THEREOF, RECORDING METHOD THEREOF, AND RECORDING/REPRODUCING APPARATUS THEREOF

This application claims the benefit of the Korean Application No. 10-2003-0048330 filed on Jul. 15, 2003, which is hereby incorporated by reference.

BACKGROUND OF THE INVENTION

1. Field of the Invention

The present invention relates to a method of managing a defective area of an optical recording medium recordable at high speed, recording/reproducing method thereof, and recording/reproducing apparatus thereof.

2. Discussion of the Related Art

Lately, it is expected that a new high-density optical recording medium, e.g., optical disc, enabling to store vast volume of high-definition video data and high-sound-quality audio data, e.g., a rewritable Blu-ray disc (BD-RE) will be developed and marketed.

The BD-RE, as shown in FIG. 1, is divided to allocate a lead-in area, data area, and lead-out area thereto. And, an inner spare area (ISA) and outer spare area (OSA) are allocated to a front end rear end of the data area, respectively.

The BD-RE records data thereon by cluster unit corresponding to a predetermined record unit. Due to the characteristics of a rewritable disc, the BD-RE enables to record data in a specific area repeatedly. In this case so, it is able to detect whether a defective area, as shown in FIG. 1, exists on the data area during recording data. In case that the defective area is detected, location information (address-A, address-B) for the defective area and another position information (address-a, address-b) recorded in the spare area by replacement as management information are recorded and stored in a defect list (DFL) of a defect management area (DMA) within the lead-in area as well as a series of replacement record operation of performing replacement recording of data, which is supposed to be recorded in the corresponding defective area, on the spare area, e.g., inner spare area (ISA) is carried out.

Currently, standardizations for high-speed (at least 2× speed) recordable BD-RE and high-speed recordable BD-WO (Blu-ray disc write once) are under discussion. And, the high-speed recordable disc considerably differs from a 1×-speed recordable disc in disc RPM, optimal write power, write pulse, and the like.

Moreover, high-speed recording tends to produce more defective areas than low-speed recording (ex., 1×-speed recording) in general. Such a defective area lowers overall performance of the corresponding disc and results in an excessive load of a corresponding system.

In case of the currently discussed high-speed recordable BD-RE or BD-WO, an efficient management scheme for the defective area is badly needed to cope with high speed. And, the efficient management scheme should be provided as specified information to secure reciprocal compatibility.

SUMMARY OF THE INVENTION

Accordingly, the present invention is directed to a method of managing a defective area of an optical disc recordable at high speed, recording/reproducing method thereof, and recording/reproducing apparatus thereof that substantially obviate one or more problems due to limitations and disadvantages of the related art.

An object of the present invention is to provide a new method of managing a defective area by specified information coping with high speed, by which information for the defective area is efficiently recorded and managed and by which recording/reproducing of an optical disc is efficiently performed via new defective area management scheme.

Another object of the present invention is to provide a new defective area managing scheme coping with a recording speed, by which management of defective area information is performed on a management area within a disc according to a specified method to provide reciprocal compatibility between discs.

A further object of the present invention is to provide a recording/reproducing method and apparatus thereof using the defective area management scheme.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an optical disc provided with a defect management area for defect management within a high-speed recordable disc, a method of managing a defective area in an optical recording medium according to the present invention comprising the steps of checking whether a defective area is found at second recording speed, the defective area found at first recoding speed, the second recording speed lower than the first recording speed and determining whether to replace the defective area with a replacement area based on the checking step.

In another aspect of the present invention, a method of managing a defective area of an optical recording medium, comprising the steps of recording first entry including a first location information of a first area decided as the defective area at first recording speed but as a non-defective area at second speed, the second speed lower than the first speed and recording second entry including a second location information of a second area decided as the defective area at both of the first speed and second speeds.

In another aspect of the present invention, a method of managing a defective area of an optical recording medium, verifying whether the defective area is generated in performing a recording at an applicable maximum speed; re-verifying presence or non-presence of defect of a corresponding area by changing a recording speed into an intermediate speed lower than the applicable maximum speed at least one time if the defective area is generated at the applicable maximum speed; re-verifying the presence or non-presence of the defect of the corresponding area by changing the recording speed into a minimum speed if the defective area is generated at the intermediate speed; and recording a location information of an area decided as the defective area at a specific area of the optical recording medium according to a result of each of the first to third steps.

In another aspect of the present invention, a recording medium, comprising: a defect management area for managing a defective area; and a data area recording data therein, wherein the defect management area includes at least first entry to record location information decided as a defective area at a first speed but as a non-defective area at a second speed, the first speed higher than the second speed.

In another aspect of the present invention, a method for recording data on an optical recording medium, comprising the steps of: receiving a recording command for a specific area; verifying whether a defective area is generated on the specific area at a first speed; re-verifying presence or non-presence of defect of a corresponding area by changing a recording speed into a second speed if the defective area is generated at the high speed, the second speed lower than the first speed; recording data to be recorded in a first area decided as the defective area at both of the first and second speeds in a replacement area as a result of re-verifying step; and recording data at the second speed on a second area decided as the defective area at the first speed but as a non-defective area at the second speed.

In another aspect of the present invention, a method for recording data on an optical recording medium, comprising the steps of: deciding a recording speed applicable to a specific area within the optical recording medium by reading a location information of a defective area and a recording speed information of the corresponding defective area from a defect management area within the optical recording medium; and performing the recording of data at the decided recording speed if receiving a recording command for the specific area.

In another aspect of the present invention, an apparatus for recording or reproducing data on or from the optical recording medium, comprising: a pickup unit recording or reading data on or from the optical recording medium; and a controller verifying whether a defective area is generated on the specific area at a first speed, re-verifying presence or non-presence of defect of a corresponding area by changing a recording speed into a second speed if the defective area is generated at the first speed, controlling the pickup to record data to be recorded in a first area decided as the defective area at both of the first and second speeds in a replacement area, and controlling the pickup to record data at the second speed on a second area decided as the defective area at the first speed but as a non-defective area at the second speed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 and FIG. 5 are diagrams for explaining a defect management method coping with a recording speed according to a first embodiment of the present invention;

FIG. 6 and FIG. 7 are diagrams for explaining a defect management method coping with a recording speed according to a second embodiment of the present invention;

DETAILED DESCRIPTION OF THE INVENTION

Figure 1:
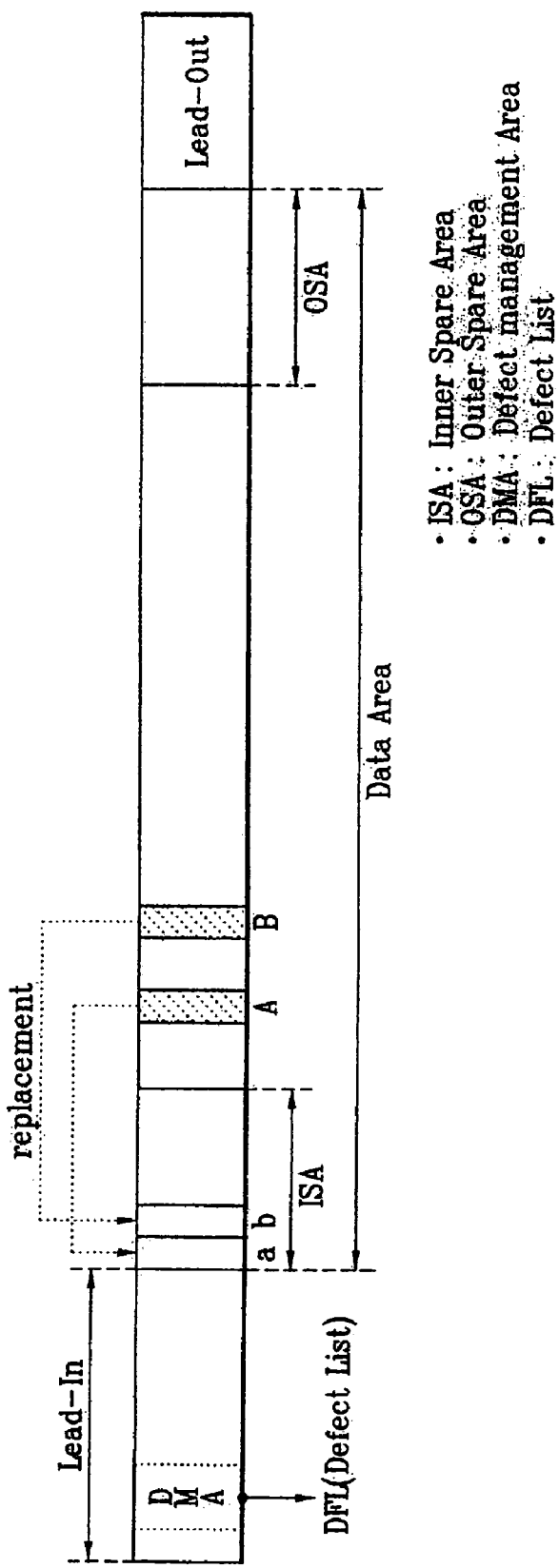
FIG. 1 is a schematic diagram of a rewritable optical disc.

Reference will now be made in detail to the preferred embodiments of the present invention, examples of which are illustrated in the accompanying drawings. Wherever possible, the same reference numbers will be used throughout the drawings to refer to the same or like parts.

A method of managing a defective area of an optical disc recordable at high speed, recording/reproducing method thereof, and recording/reproducing apparatus thereof according to the present invention are explained in detail by referring to the attached drawings as follows.

First of all, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

For convenience of explanation, a Blu-ray disc (BD) of the BD series is taken as an example of a high-speed recordable disc. Yet, it is apparent that the concept of the present invention be applicable to various kinds of high-density high-speed recordable optical discs.

The present invention is characterized in proposing a new defective area management scheme in a high-speed recordable optical disc. Preferentially, meanings of 'defective area' and 'defective area management' used in the following description are explained as follows.

First of all, 'defective area' in the present invention means a specific area within a disc that is highly probable to develop into an uncorrectable area due to a specific reason later. In the current step, the 'defective area' means an area where data of the corresponding area are sufficiently reserved. 'Managing a defective area' means a sort of management scheme enhancing reliance of data recorded within a disc in a manner of designating a specific area, in which the corresponding data are recorded or to be recorded, as a defective area prior to becoming an uncorrectable area and transferring the data to a replacement area within the disc. Specifically, in case of recording or reproducing information that data themselves are significantly meaningful such as PC data, defective area management will be highly needed.

Hence, it may be very important to prepare a reference for which case is decided as a 'defective area'. Such a reference can be made to lower occurrence of the 'defective area' by applying a somewhat higher criterion to reduce a load of system designed by a system designer (for the prevention of frequent replacement recordings) or, on the contrary, to designate more 'defective areas' by applying a somewhat lower criterion to secure more reliance of data so that data are safely transferred to a replacement area.

For the reference for the decision of the defective area, different references are proposed by various disc standards, respectively. And, a quantity of errors occurring within recording unit is generally taken as the reference. For instance, if errors exceeding a specific number take place, it is decided as 'defective area' and replacement recording is performed to record data in a replacement area. If errors fail to occur to exceed the specific number, it is not decided as 'defective area' and the corresponding errors are corrected using ECC (error correction code), etc. Hence, by taking optimal system and data protection into consideration, a system designer defines the reference for 'error quantity amounting to a specific number within recording unit' that will be applied to the system, whereby it is able to decide whether the corresponding recording unit is determined as 'defective area' or 'normal area'.

In deciding the defective area, the present invention intends to propose a defective area deciding method additionally coping with a recording speed by adopting the above-explained defective area deciding method (e.g., how much is the 'error quantity amounting to a specific number within recording unit?). This is because there exists a difference in the error quantity occurring within the recording unit according to a recording speed difference to affect the decision of 'defective area'. More 'defective areas' are generally generated in recording at high speed, which is because an error quantity occurring within recording unit at high speed increases more than that at low speed since an overall system becomes unstable at high speed.

Figure 2:
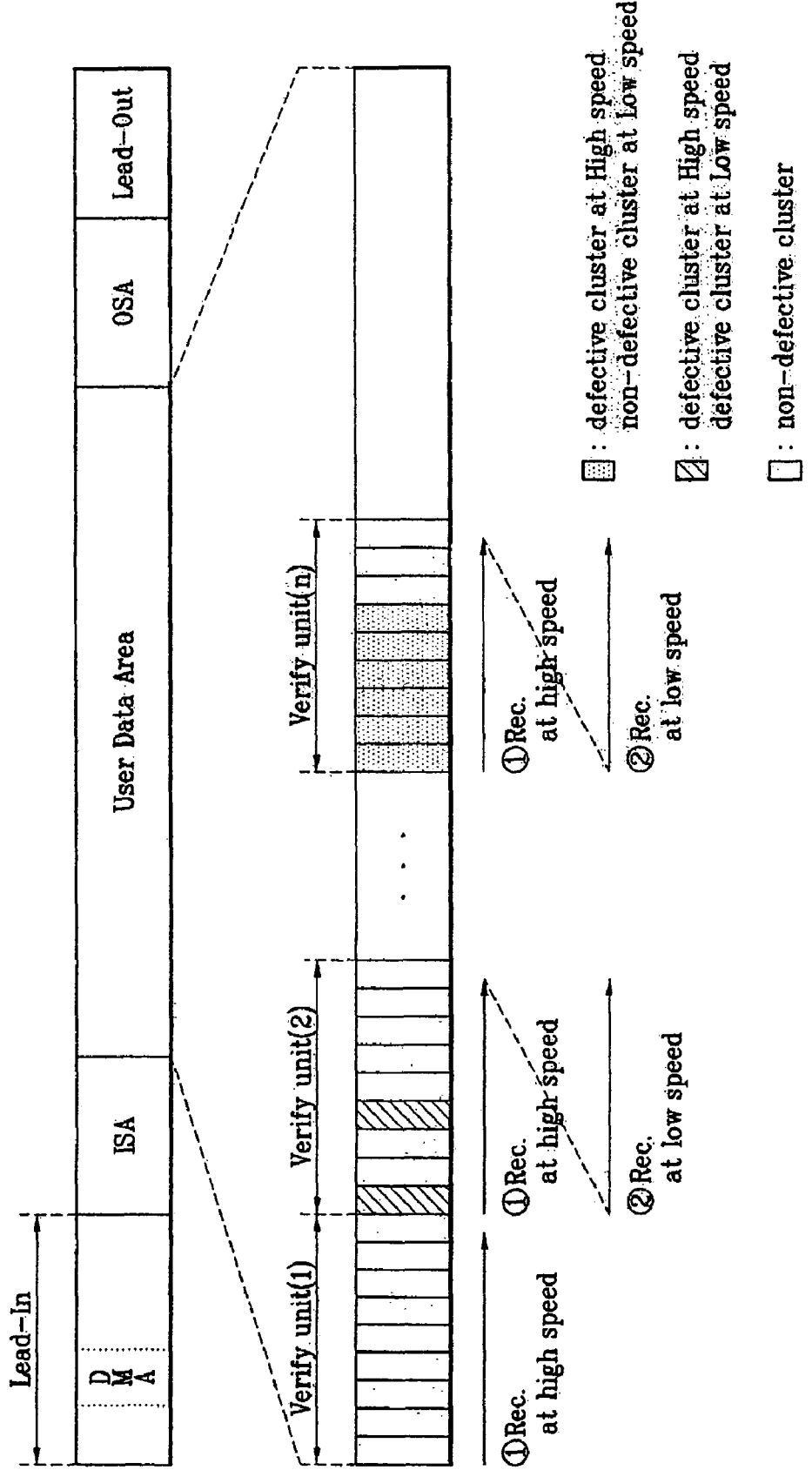
FIG. 2 is a diagram of an optical disc for explaining a defect management method coping with a recording speed according to the present invention.
Figure 3:
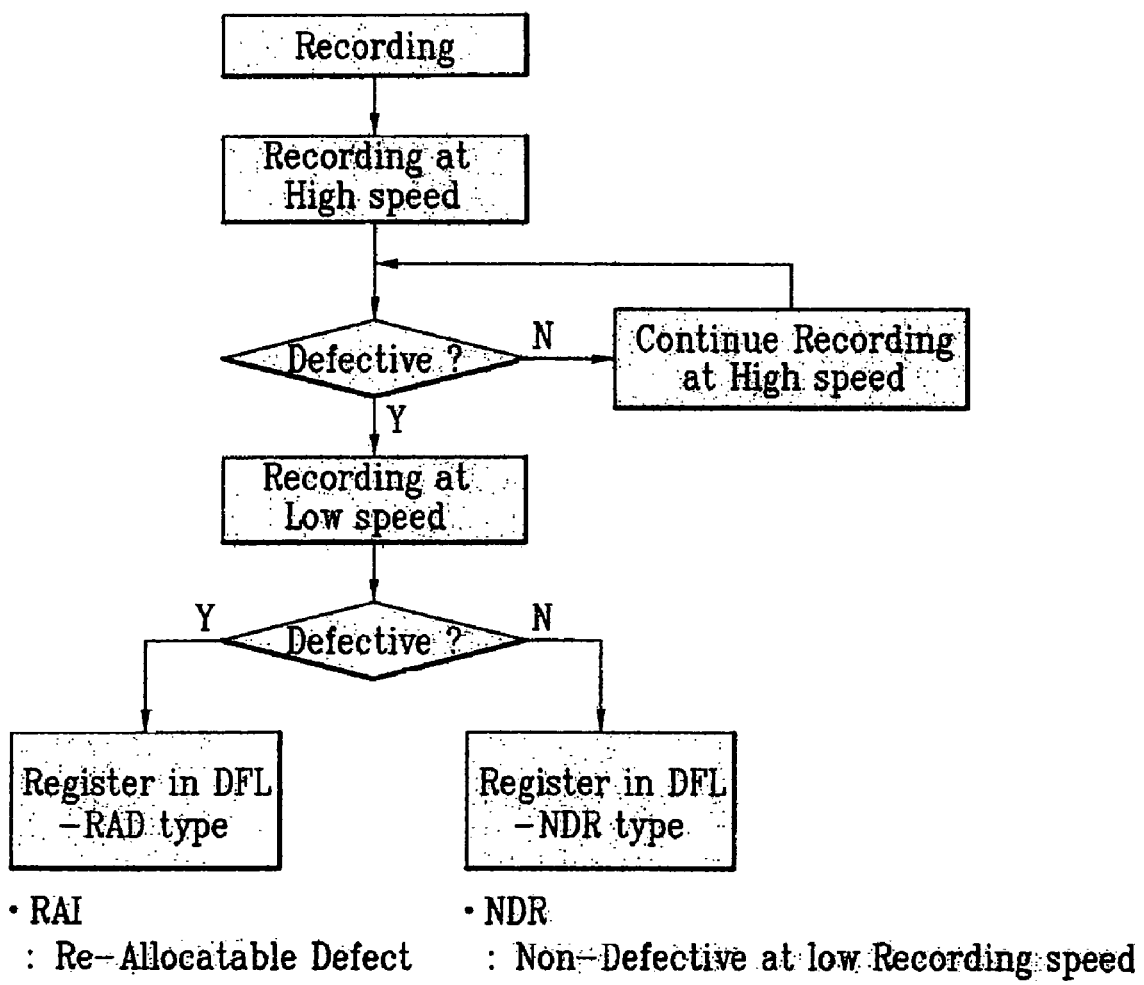
FIG. 3 is a conceptional flowchart for explaining a defect management method coping with a recording speed according to the present invention.

FIG. 2 and FIG. 3 are schematic diagrams of an optical disc structure and flowchart for explaining a concept of a defective area management method coping with a recording speed according to the present invention.

FIG. 2 shows a flow of performing recording on an optical disc according to the present invention.

Referring to FIG. 2, in performing recording within data area of a disc, recording is preferentially performed on a specific section at applicable high speed and then it is verified whether a defective area is generated in the corresponding section. For instance, the specific section is named 'verify unit' and is one verify unit, as shown in FIG. 2, includes about nine recording units. Yet, the number of the recording units, which is nine, is set up for convenience of explanation and can be further set up differently.

If a defective area fails to be generated at the corresponding high speed like the verify unit(1) in FIG. 2, the above procedure is repeated for a next verify unit(2). If a defective area is generated from the verify unit(2), the recording speed is lowered at low speed and the presence or non-presence of the defective area is then verified again. If the corresponding area is decided as the defective area in case of performing recording at low speed, the corresponding area is decided as a previous defective area for performing replacement recording with a spare area and defective area management is then performed thereon.

Yet, in case of a verify unit(n), if an area is decided as a non-defective area at low speed despite being decided as a defective area at high speed, the corresponding area is not replaced by a spare area, recording is performed at low speed on the corresponding area regarded as non-defective, and location information and speed information of the corresponding area are recorded in a defect management area DMA to be managed.

Hence, the area decided as a non-defective area according to a variation of recording speed is handled as a normal area but the corresponding recording speed information for the decision of the non-defective area is managed altogether. Thus, the corresponding area enables to be recorded at the corresponding recording speed, whereby a system load due to the replacement recording can be reduced as well as data reliance is maintained.

The defective area verifying method can be performed in various ways. If data reliance security is important, 'verify after write' is adopted. The 'verify after write' is an optional system item. And, it is apparent that various verifying schemes be applicable to the present invention.

FIG. 3 shows the technical background of the present invention.

Referring to FIG. 3, if a defective area is generated in the course of performing recording at high speed, as explained in FIG. 2, an existence or non-existence of defect in the corresponding area is re-verified by lowering a recording speed down to low speed. If it is decided as a defective area at the low speed, defect information (RAD type: re-allocatable-defect) is recorded as information meaning normal replacement recording in a defect list DFL within a defect management area. If it is not decided as a defective area at the low speed, replacement recording is not performed but another defect information of which type is different from that of the normally replaced defect information is recorded in the defect list DFL within the defect management area (NDR type: non defective at low recording speed).

Meanwhile, by referring to FIGS. 4 to 12, a defective area management method and defect information recording method supporting the technical background of the present invention are explained in detail as follows.

First of all, a general method of recording location information of a defective area within a defect management area in a defect-list (DFL) is explained as follows.

A defect list includes a list, and the list includes a plurality of entries one of which is constructed with 8-bytes recording location information of a defective area therein. One entry includes fields status1 and status2 recording identification information for identifying a defective area type, 'Defective cluster first PSN' field generally recording a location decided as a defective area within a data area therein, and 'Replacement cluster first PSN' field recording a location of an area replacing the defective area therein. Yet, the field names use the same field names for compatibility of the previous BD-RE only. Hence, the contents written in the corresponding fields may be different from those of the general cases, which are explained in detail via embodiments of the present invention as follows.

Figure 4:
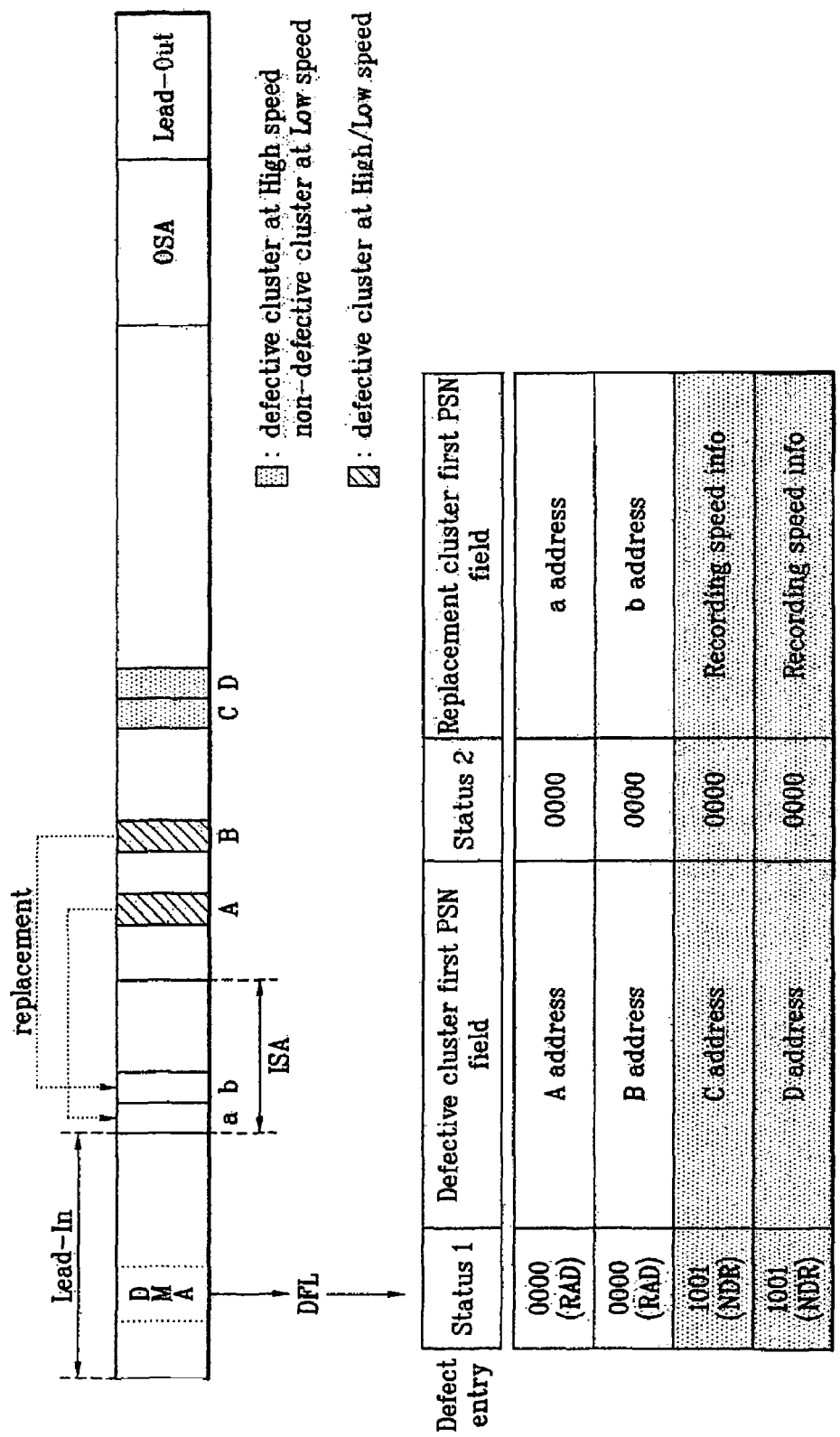

FIG. 4 and FIG. 5 are diagrams for recording to manage location information of a defective area according to a first embodiment of the present invention, in which location information for a defective area is recorded per cluster as a minimum recording unit.

Referring to FIG. 4, two types of defective areas exist within a data area. One defective area type corresponds to a case decided as a defective area at both high speed and low speed (A, B), whereas the other defective area type corresponds to a case decided as a defective area at high speed but as a non-defective area at low speed (C, D).

Hence, data to be recorded in the cluster-A and cluster-B are recorded by replacement in area-a and area-b within a spare area, respectively. For the information of a defective area for this, 'status1=0000' is recorded as RAD (re-allocatable-defect) type entry designating that information of the defective area is normally replaced, location information of the area-A and area-B is recorded in 'Defective cluster first PSN' field, and location information of the corresponding area-a and area-b is recorded in 'Replacement cluster first PSN' field to be managed.

Meanwhile, replacement recording is not performed on the area-C and area-D which are decided as defective areas at high speed only but as normal areas at low speed, whereby a defect information recording method of the area-C and area-D should be different from that of the area-A and area-B. Hence, 'status1=1001' is given to define the entry as NDR (non-defective at low recording speed), location information of the area-C and area-D is recorded in 'Defective cluster first PSN' field, and recording speed information of the case decided as a non-defective area is recorded in 'Replacement cluster first PSN' field since there exists no replaced area. When the corresponding optical disc is reloaded later, a recording/reproducing unit ('10' in FIG. 12) refers to the corresponding management information and performs recording on the area-C and area-D by referring to the recording speed information recorded in the corresponding entry so that no defective area is generated from the area-C and area-D. Thus, it is able to lower probability of defective area generation. Besides, it is also possible to record high speed information of the generated defective area as recording speed information recorded in 'replacement cluster first PSN' field. As the system also enables to be informed by the high speed information that the defective area was generated at the speed written in the entry, it is able to perform recording at a predetermined speed lower than the written speed.

FIG. 5 shows a table for identifying an entry as the defect information in case of FIG. 4.

Referring to FIG. 5, if 'status1=0000', it means that the corresponding area is a normally replaced defective area (RAD entry). If 'status1=1001', it means that the corresponding area is decided as a defective area at high speed but as a non-defective area at low speed (NDR entry) and that recording speed information in case of deciding the non-defective area, i.e., information for low speed, is recorded within the corresponding NDR entry.

Figure 6:
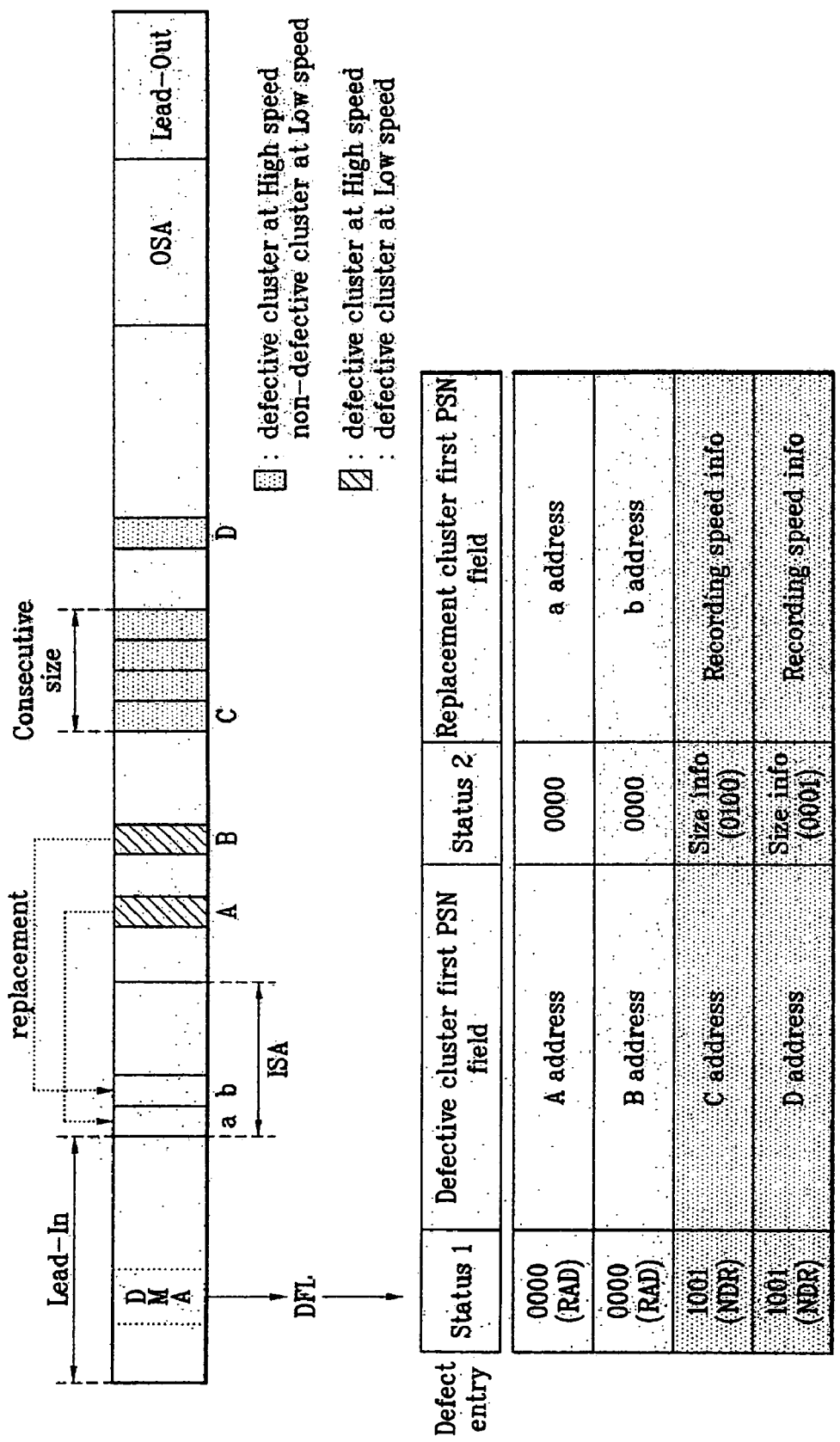

FIG. 6 and FIG. 7 are diagrams for recording to manage location information of a defective area according to a second embodiment of the present invention, in which location information for a defective area is recorded per cluster as a consecutive minimum recording unit.

Referring to FIG. 6, two types of defective areas exist within a data area. One defective area type corresponds to a case decided as a defective area at both high speed and low speed (A, B), whereas the other defective area type corresponds to a case decided as a defective area at high speed but as a non-defective area at low speed (C, D).

Hence, data to be recorded in the cluster-A and cluster-B are recorded by replacement in area-a and area-b within a spare area, respectively. For the information of a defective area for this, 'status1=0000' is recorded as RAD (re-allocatable-defect) type entry designating that information of the defective area is normally replaced, location information of the area-A and area-B is recorded in 'Defective cluster first PSN' field, and location information of the corresponding area-a and area-b is recorded in 'Replacement cluster first PSN' field to be managed.

Meanwhile, replacement recording is not performed on the area-C and area-D which are decided as defective areas at high speed only but as normal areas at low speed, whereby a defect information recording method of the area-C and area-D should be different from that of the area-A and area-B. And, it can be seen that the area-C corresponds to a case that a plurality of clusters are decided as a same area and that the area-D is an area corresponding to one cluster only. Hence, it is defined that 'status1=1001' is given to indicate the NDR (non-defective at low recording speed) type and that a binary value representing a number of consecutive recording units of the corresponding area is written in 'status2' field. For instance, 4-clusters are consecutive in the area-C, 'status2=0100' is recorded. The area-D consists of one cluster, 'status2=0001' is recorded. The rest fields are recorded like the first embodiment of the present invention. Location information of the area-C and area-D as start cluster of consecutive recording units is recorded in 'Defective cluster first PSN' field, and recording speed information of the case decided as a normal area is recorded in 'Replacement cluster first PSN' field since there exists no replaced area. When the corresponding optical disc is reloaded later to perform recording on the area-C and area-D, a recording/reproducing unit ('10' in FIG. 12) performs the recording by referring to the recording speed information recorded in the corresponding entry so that no defective area is generated from the consecutive clusters indicated by size information within defect management information. Thus, it is able to lower probability of defective area generation. Besides, it is also possible to record high speed information of the generated defective area as recording speed information recorded in 'Replacement cluster first PSN' field. As the system also enables to be informed by the high speed information that the defective area was generated at the speed written in the entry, it is able to perform recording at a predetermined speed lower than the written speed.

FIG. 7 shows a table for identifying an entry as the defect information in case of FIG. 6.

Referring to FIG. 5, if 'status1=0000', it means that the corresponding area is a normally replaced defective area (RAD entry). If 'status1=1001', it means that the corresponding area is decided as a defective area at high speed but as a non-defective area at low speed (NDR entry), that size information of consecutive clusters is recorded in 'status2' field within the NDR entry, and that recording speed information in case of deciding the non-defective area, i.e., information for low speed, is recorded in 'Replacement cluster first PSN' field within the corresponding NDR entry.

Compared to the first embodiment according to the present invention, the second embodiment according to the present invention is characterized in enabling to lower the number of entries.

Figure 8:
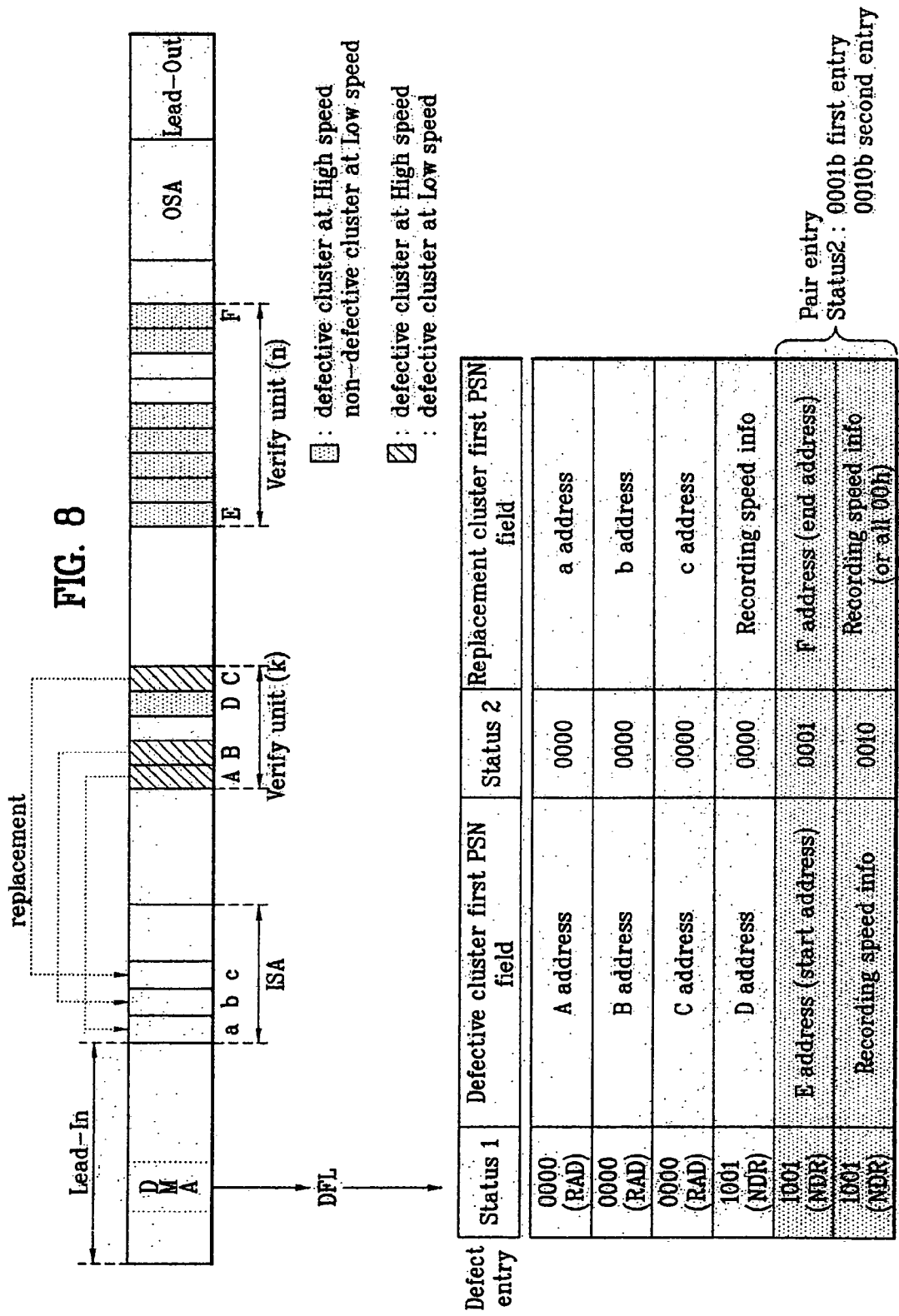
FIG. 8 and FIG. 9 are diagrams for explaining a defect management method coping with a recording speed according to a third embodiment of the present invention.
Figures 9, 10:
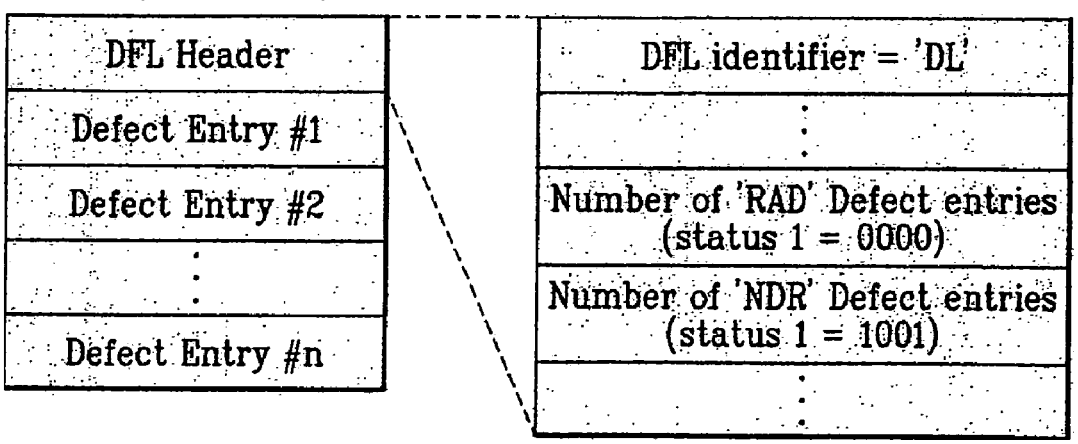
FIG. 10 is a schematic structural diagram of a defect list applicable to the present invention.

FIG. 8 and FIG. 9 are diagrams for recording to manage location information of a defective area according to a third embodiment of the present invention, in which location information of an area decided as a defective area at high speed only but as a non-defective area at low speed is designated by a section to be recorded therein.

Referring to FIG. 8, two types of defective area sections exist within a data area. One defective area section type corresponds to a case decided as a defective area at both high speed and low speed (section A~C, verify unit(k)), whereas the other defective area section type corresponds to a case decided as a defective area at high speed but as a non-defective area at low speed (section E~F, verify unit(n)).

First of all, as a result of re-verifying the section A~C, which was decided as a defective area at high speed, at low speed, the area-A, area-B, and area-C are decided as defective areas but the area-D is decided as a non-defective area at low speed. In such a case, defect information for the corresponding section is individually recorded per cluster in a defect management area.

Yet, as a result of re-verifying the section E~F, which was decided as a defective area at high speed, at low speed, all clusters are decided as non-defective areas. In such a case, one defect information is recorded for the corresponding section overall (area-E to area-F).

Hence, data to be recorded in the cluster-A, cluster-B, and cluster-C are recorded by replacement in area-a, area-b, and area-C within a spare area, respectively. For the information of a defective area for this, 'status1=0000' is recorded as RAD (re-allocatable-defect) type entry designating that information of the defective area is normally replaced, location information of the area-A, area-B, and area-C is recorded in 'Defective cluster first PSN' field, and location information of the corresponding area-a, area-b, and area-c is recorded in 'Replacement cluster first PSN' field to be managed.

Meanwhile, replacement recording is not performed on the area-D, which is decided as a defective area at high speed only but as a normal area at low speed, within the section A~C whereby a defect information recording method of the area-D should be different from that of the area-A, area-B, and area-C. Hence, 'status1=1001' is given to indicate the NDR (non-defective at low recording speed) type and 'status2=0000' is set to inform that the corresponding area is recorded as one cluster by one entry.

Yet, in order to represent this, the section E~F needs a pair of entries (pair entry). In a first entry, 'status2=0001' informs a first one of a pair of entries and location informations of area-E and area-F meaning start and end clusters of the same section, respectively are recorded in 'Defective cluster first PSN' field and 'Replacement cluster first PSN' field, respectively. In a second entry, 'status2=0010' informs a second one of a pair of entries and recording speed information for low speed resulting in no defective area is repeatedly recorded in 'Defective cluster first PSN' field and 'Replacement cluster first PSN' field. Yet, the 'Replacement cluster first PSN' field of the second entry can be set to '00h' instead of recording the recording speed information repeatedly.

Besides, it is also possible to record high speed information of the generated defective area as recording speed information recorded in 'Defective cluster first PSN' field of the second entry. As the system also enables to be informed by the high speed information that the defective area was generated from the corresponding section at the speed written in the entry, it is able to perform recording at a predetermined speed lower than the written speed.

FIG. 9 shows a table for identifying an entry as the defect information in case of FIG. 8.

Referring to FIG. 9, if 'status1=0000', it means that the corresponding area is a normally replaced defective area (RAD entry). If 'status1=1001', it means that the corresponding area is decided as a defective area at high speed but as a non-defective area at low speed (NDR entry). If 'status2=0000', it means one entry coping with each cluster. If 'status2=0001', it means the first entry of a pair of the entries indicating a specific section. If 'status2=0010', it means the second entry of a pair of the entries indicating the specific section.

The third embodiment of the present invention enables not only to cope with each section so that a system changes a recording speed per cluster but also to reduce a load.

FIG. 10 is a schematic structural diagram of a defect list applicable to the present invention.

Referring to FIG. 10, information for informing how many entries of a specific type exist among defect entries recorded in a corresponding DFL is included in a header of the DFL. Hence, by recording the numbers of RAD-entry and NDR-entry in header information, a system is facilitated to preferentially recognize the number of entries from the DFL header information.

Figure 11:
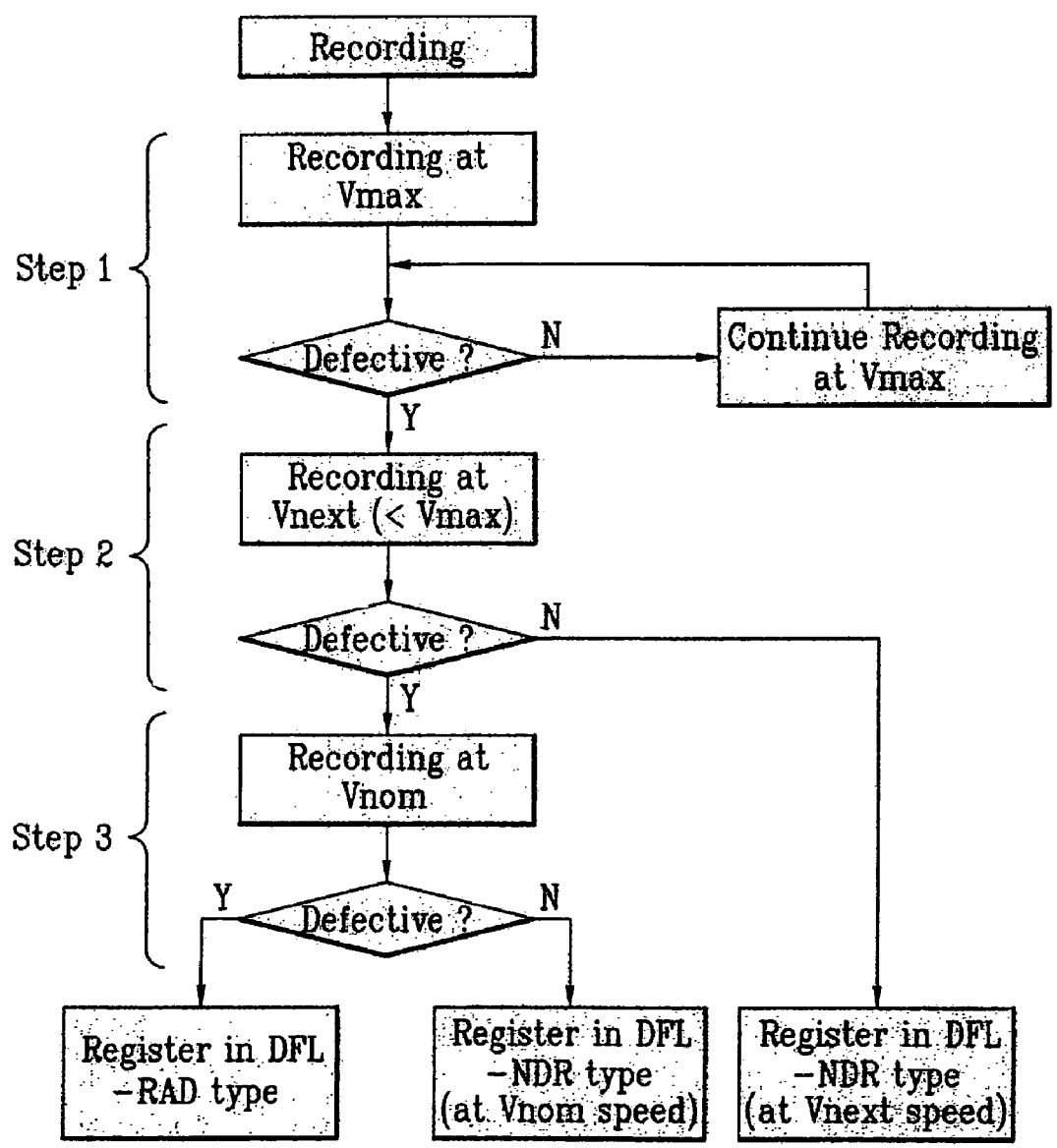
FIG. 11 is another conceptional flowchart for explaining a defect management method coping with a recording speed according to the present invention.

FIG. 11 is another conceptional flowchart for explaining a defect management method coping with a recording speed according to the present invention, in which the conceptional flowchart of FIG. 3 is extended.

Referring to FIG. 11, a recording/reproducing apparatus ('10' in FIG. 12) having received a recording command initiates recording at maximum speed Vmax applicable by a disc and keeps performing the recording at Vmax unless a defective area is generated during the recording. If verifying the defective area, the recording/reproducing apparatus re-verifies existence or non-existence of a defect of the corresponding area at low speed Vnext lower than the maximum speed Vmax (Step 1).

If it is decided that the corresponding area is not a defective area in case of the recording at Vnext, location information of the corresponding area and recording speed information of non-existence of the defective area at Vnext are registered to DFL using one of the methods according to the first to third embodiments of the present invention in FIG. 4, FIG. 6, and FIG. 8. In doing so, as explained in the first to third embodiments of the present invention, 'Vmax' can be registered as the recording speed information to the DFL instead of Vnext. In the recording at Vnext, if the corresponding area is decided as the defective area like the recording at Vmax, existence or non-existence of a defect in the corresponding area is re-verified at Vnom corresponding to 1× speed applicable by the disc (Step 2).

In doing so, it is able to set up a plurality of recording speeds corresponding to the Vnext according to a system in Step 2. For instance, 'Vmax=16× speed', 'Vnext1=8× speed', 'Vnext2=4× speed', 'Vnext3=2× speed' are set up as the recording speeds, and Step 2 is repeated several times prior to verifying the corresponding area at a final recording speed of 'Vnom=1× speed'.

Finally, if the corresponding area is decided as a non-defective area in case of the recording at Vnom, location information of the corresponding area and recording speed information of existence of the non-defective area at Vnom are registered to DFL using one of the methods according to the first to third embodiments of the present invention in FIG. 4, FIG. 6, and FIG. 8. In doing so, as explained in the first to third embodiments of the present invention, 'Vnext' can be registered as the recording speed information to the DFL instead of Vnom. In the recording at Vnom, if the corresponding area is decided as the non-defective area like the recording at Vnext, data of the corresponding area are transferred to a replacement area for replacement recording and location information of the defective area and the location information of the replacement area are registered to the DFL (Step 3).

Figure 12:
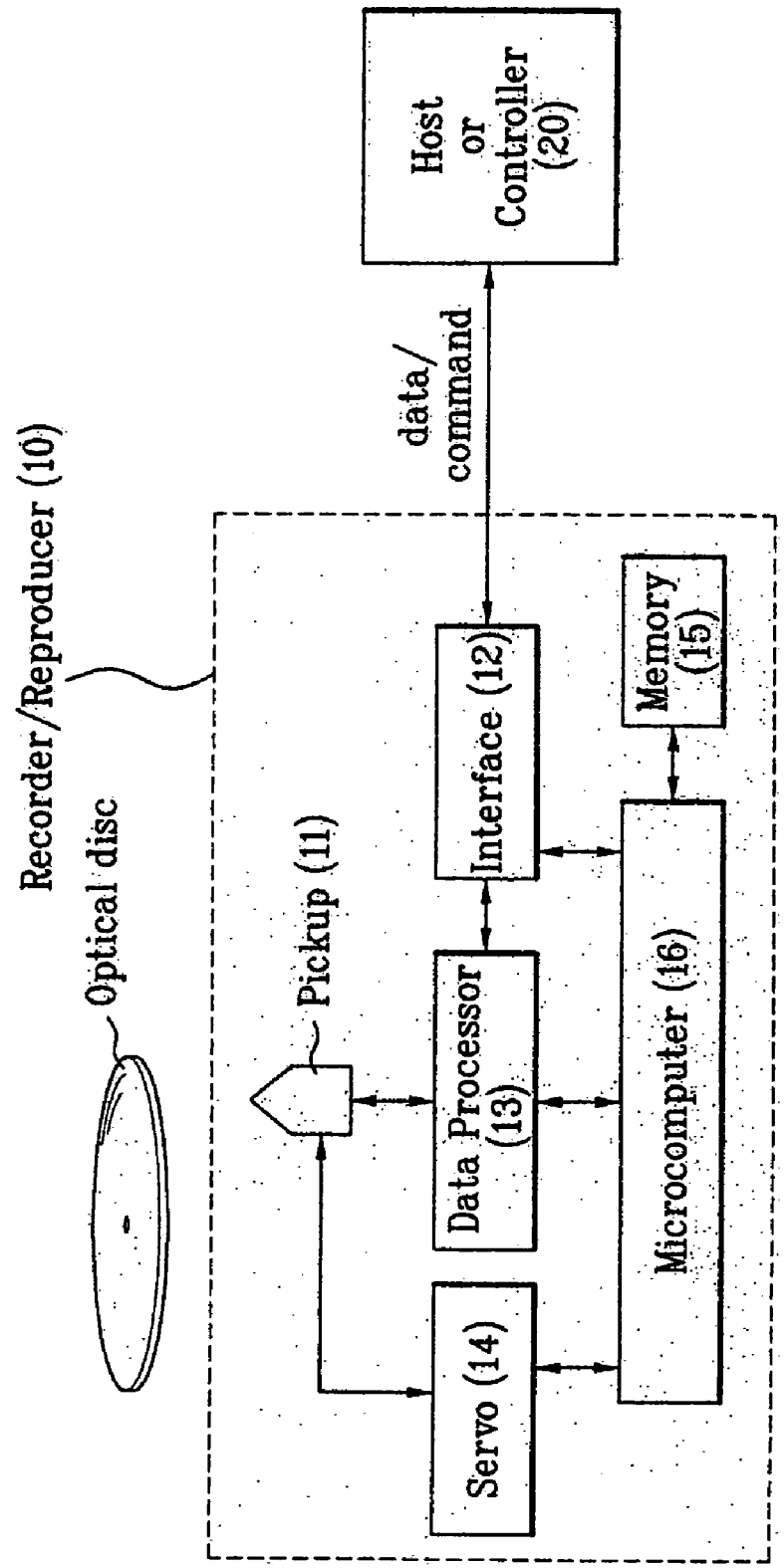
FIG. 12 is a block diagram of a recording/reproducing apparatus applicable to defect management coping with recording speed of the present invention.

FIG. 12 shows a recording/reproducing apparatus for an optical disc applicable to the present invention.

Referring to FIG. 12, a recording/reproducing apparatus according to the present invention includes a recorder/reproducer 10 carrying out recording/reproducing on an optical disc and a control unit 20 controlling the recorder/reproducer 10. The control unit 20 gives a recording or reproducing command for a specific area, and the recorder/reproducer 10 caries out the recording/reproducing on the specific area according to the command of the control unit 20. Specifically, the recorder/reproducer 10 includes an interface unit 12 performing communications with an external device, a pickup unit 11 directly recording data on the optical disc or reproducing the data, a data processor 13 receiving a reproducing signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing various informations including a management information and data, and a microcomputer 16 responsible for controlling the above-described elements within the recorder/reproducer 10.

A recording process of an optical disc according to the present invention is explained in detail as follows.

First of all, once an optical disc is loaded in the recording/reproducing apparatus, the entire disc management information within the disc is read out to be temporarily stored in the memory 15 of the recorder/reproducer 10. And, various kinds of the disc management information are utilized for the recording/reproducing on/from the optical disc. Specifically, a defect list (DFL) recorded within a defect management area of the present invention is included in the management information stored in the memory 15. Hence, location information of a defective area and location information of a replacement area within the DFL are read out to be stored in the memory 15. In case of specific defect information (NDR-type), recording speed information is read out to be stored in the memory 15 as well. If the disc is a brand-new disc, such a defect information as NDR-type entry and RAD-type entry will not exist in the DFL within the defect management area.

If intending to perform a recording on a specific area within the optical disc, the control unit 20 renders such an intent into a writing command and then delivers it to the recorder/reproducer 10 together with data for writing location information of a recording-target area. After receiving the writing command, the microcomputer 16 decides the corresponding recording speed, which will be applied to the recording-target area within the optical disc by the control unit, from the defect management information stored in the memory 15. Specifically, if the recording-target area is registered as defect information (NDR type), the recording speed information recorded within the corresponding defect information is adopted to be decided as the recording speed for the corresponding area. If the recording-target area is not registered as defect information (NDR type), high speed applicable to the disc and system is decided as the recording speed.

Subsequently, it is verified whether a defective area is generated while the recording is performed at the decided high speed. If the defective area is generated at high speed as a result of the verification, the recording speed is changed into low speed and it is then re-verified whether a defective area is generated from the corresponding area. For an area decided as the defective area at both high and low speeds, data that will be written in the corresponding area are recorded in a replacement area by replacement. For an area decided as the defective area at high speed but as a non-defective area at low speed, the recording is performed at the low speed. And, the defective area generated from the recording is recorded in the defect management area in a manner of one of the embodiments according to the present invention shown in FIG. 4, FIG. 6, and FIG. 8. Yet, if an initially decided recording speed is low speed, the above-explained defective area management schemes are not adopted. Instead, the defect area management method of performing replacement recording on the entire defective areas is adopted to cope with the recording speeds.

Accordingly, the present invention proposes a defect management scheme coping with recording speeds in a high-speed recordable optical disc, thereby providing an accurate decision of the defective area to lower frequency of defective area generation. Specifically, the present invention provides optimal recording speed information for a specific section, thereby enabling to reduce a system load overall. Moreover, as optimal recording speed is applicable to re-recording in a specific section, thereby enabling to secure high reliance of data.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of managing a defective area in a recording medium, the method comprising:
    (a) checking whether a defective area is generated at a first recording speed;
    (b) if the defective area is generated at the first recording speed, checking whether the defective area is generated at a second recording speed, wherein the second recording speed is lower than the first recording speed; and
    (c) determining whether to replace the defective area with a replacement area based on a result of the step (b),
    wherein if the defective area is generated at the first recording speed and the defective area is not generated at the second recording speed, the method further comprises recording a management information to indicate at least a location of the defective area.

2. The method of claim 1, wherein the management information further includes status information indicating that the defective area is not replaced.

3. The method of claim 1, wherein the management information further includes speed information of the second recording speed.

4. The method of claim 1, wherein the management information further includes speed information of the first recording speed.

5. The method of claim 1, wherein the management information is recorded as one entry per minimum recording unit.

6. The method of claim 5, wherein the minimum recording unit is one cluster.

7. The method of claim 1, wherein the management information is recorded as one entry for a consecutive minimum recording unit.

8. The method of claim 7, wherein the entry includes information designating a number of the consecutive minimum recording unit.

9. The method of claim 1, wherein the management information includes a start position of the defective area and an end position of the defective area.

10. The method of claim 9, wherein the management information further includes speed information of first recording speed or second recording speed.

11. The method of claim 10, wherein the start position and the end position are included in a first entry and the speed information for the defective area is included in a second entry.

12. The method of claim 11, wherein identification information for identifying the first and second entries is recorded in the corresponding entry.

13. A method of managing a defective area of an optical recording medium, the method comprising:
    verifying whether the defective area is generated in performing a recording at an applicable maximum speed;
    re-verifying a presence or non-presence of a defect of a corresponding area by changing a recording speed into an intermediate speed lower than the applicable maximum speed at least one time if the defective area is generated at the applicable maximum speed;
    re-verifying the presence or non-presence of the defect of the corresponding area by changing the recording speed into a minimum speed if the defective area is generated at the intermediate speed; and recording a location information of an area decided as the defective area at a specific area of the optical recording medium according to a result of each of the first to third steps, wherein for the area decided as the defective area at the first step but as a non-defective area at the second step, the location information of the corresponding area is recorded at the specific area.

14. The method of claim 13, wherein a recording speed information applied to the second step is further recorded at the specific area.

15. The method of claim 13, wherein a recording speed information applied to the first step is further recorded at the specific area.

16. A method for recording data on an optical recording medium, the method comprising:

receiving a recording command for a specific area;

verifying whether a defective area is generated on the specific area at a first speed;

re-verifying a presence or non-presence of a defect of a corresponding area by changing a recording speed into a second speed if the defective area is generated at the first speed, the second speed being lower than the first speed;

recording data to be recorded in a first area decided as the defective area at both of the first and second speeds in a replacement area as a result of re-verifying step; and recording data at the second speed on a second area decided as the defective area at the first speed but as a non-defective area at the second speed, wherein the step of recording the data at the second speed on the second area further includes recording a management information to indicate at least a location of the defective area.

17. An apparatus for managing a defective area in a recording medium, the apparatus comprising:

a control unit configured to:

first check whether a defective area is generated at a first recording speed;

second check whether the defective area is generated at a second recording speed; and determine whether to replace the defective area with a replacement area based on the result of the second checking; and a pickup unit configured to record or reproduce data on/from the recording medium according to controlling of the control unit, wherein the second recording speed is lower than the first recording speed, and wherein the control unit is further configured to control the pickup unit to record management information indicating at least a location of the defective area, if the defective area is generated at the first recording speed and the defective area is not generated at the second recording speed.

18. The apparatus of claim 17, further comprising:

a host configured to transmit a command for recording or reproducing data to or from a specific area of the recording medium to the control unit via an interface unit, wherein the control unit is further configured to control the recording or reproducing according to the command from the host.

* * * * *